Patented Oct. 30, 1945

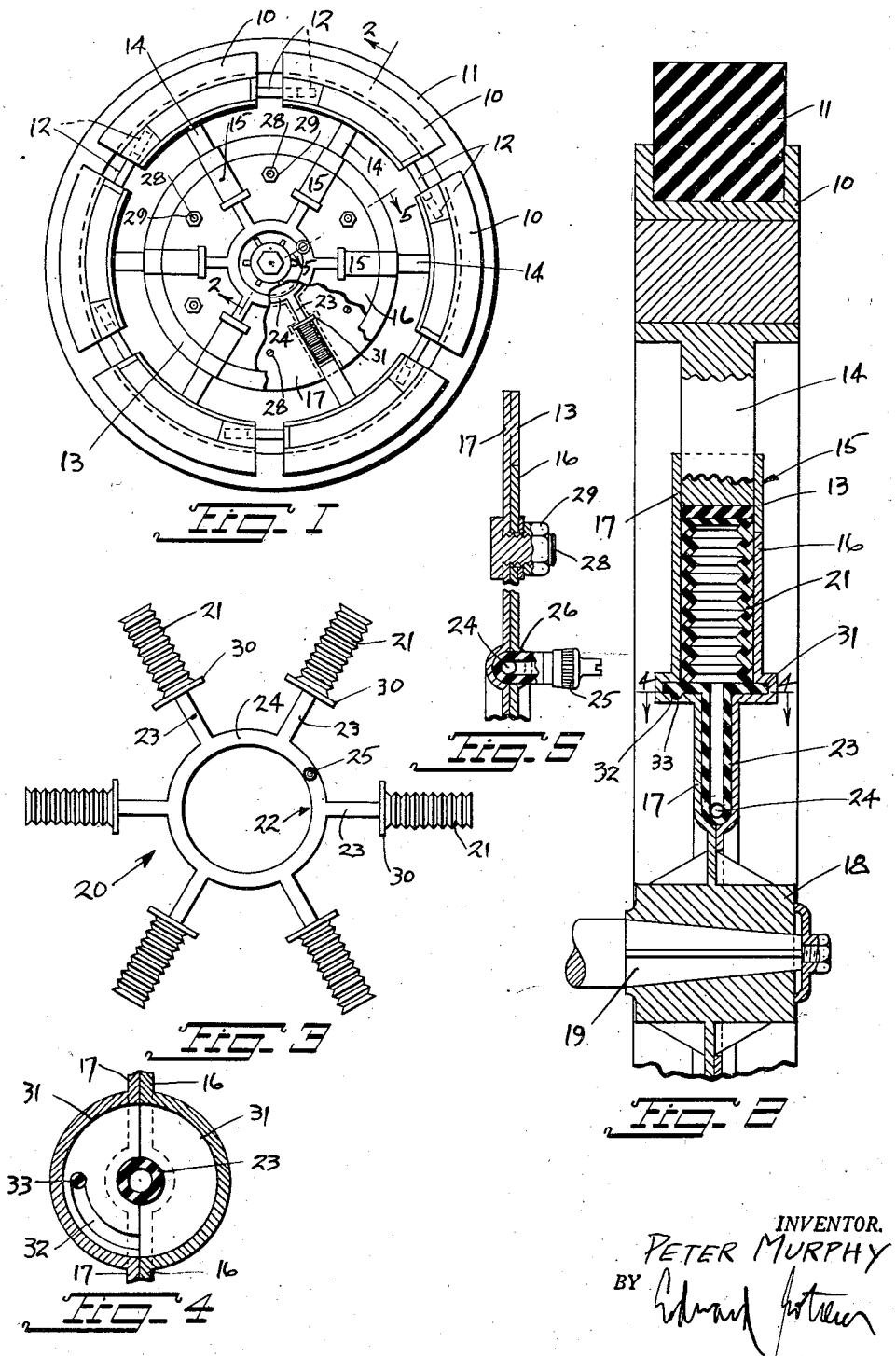

2,387,930

UNITED STATES PATENT OFFICE 2,387,930

SOLID TIRE CUSHION WHEEL

Peter Murphy, Brooklyn, N. Y.

Application November 28, 1944, Serial No. 565,479

7 Claims. (Cl. 152—8)

This invention relates to new and useful improvements in a solid tire cushion wheel, and particularly constitutes an improvement over my United States Letters Patent No. 2,333,947 granted November 9, 1943.

I have found that in my prior invention it is quite difficult to replace a pneumatic cushion when it leaks, or becomes worn. From my experiments it appears quite certain that the public would experience this same difficulty. In the instant invention I have improved the pneumatic cushioning in such a way that it absolutely eliminates any possibility of any of the pneumatic cushions leaking after occasion requires that they be replaced.

More specifically, in this present invention, I make use of a removable resilient pneumatic unit. The unit includes all of the pneumatic cushions required for the wheel. The wheel is so constructed that the unit may easily be removed and replaced. The dominating feature of the improvement resides in the fact that it is impossible for any of the pneumatic cushions to leak because the unit is complete and enclosed. No skill is required to mount it in position.

Still further the invention proposes the construction of an improved solid tire cushion wheel which is simple and durable, and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

Fig. 1 is a side elevational view of a solid tire cushion wheel constructed in accordance with this invention, a portion thereof being broken away to disclose interior parts.

Fig. 2 is a fragmentary enlarged sectional view taken on the line 2—2 of Fig. 1.

Fig. 3 is an elevational view of the removable resilient cushioning unit.

Fig. 4 is a fragmentary enlarged horizontal sectional view taken on the line 4—4 of Fig. 2.

Fig. 5 is a fragmentary sectional view taken on the line 5—5 of Fig. 1.

The new and improved solid tire cushion wheel, in accordance with this invention, includes a plurality of segmental rim sections 10 supporting a solid tire 11. These rim sections 10 have the usual inter-engaging parts 12 to hold them in relative positions in the usual way. Each rim section 10 is provided with a supporting spoke or piston 14 which slidably engages into a cylinder 15 of a hub section of the wheel. This hub section has a fixed back plate 17, a fixed annular outer front strip 13 and a removable inner front plate 16. The main inner portions of the cylinders 15 are formed half in the removable plate 16 and half in the hub plate 17. The outer portions of said cylinders 15 are formed half in the back plate 17 and half in the annular outer front strip 13. The annular outer front strip 13 is welded to the back plate 17.

The hub back plate 17 connects with a hub portion 18 by which the wheel is mounted upon the wheel axle 19, in the usual way. The cylinders 15 and pistons 14 are provided with pneumatic cushioning means in the nature of a removable resilient unit 20, see Fig. 3. This resilient unit 20 is provided with expansible and contractable bags or bellows portions 21 located within the cylinders 15. The bellows portions 21 are connected together by a tube portion 22. Each bellows portion 21 connects with a tubular stem 23 which in turn is connected with an annular tube 24. This annular tube 24 is provided with the usual tire valve 25. The tire valve 25 projects through an opening 26 formed in the removable front plate 16. The front plate 16 is releasibly held in position by a plurality of studs 28. These studs 28 are welded upon the hub back plate 17 and merely pass through openings in the front plate 16. Lock nuts 29 are removably mounted on the studs 28.

The pneumatic cushioning unit 20 is associated with means for releasibly mounting it on the hub back plate 17. For this purpose each bellows portion 21 is provided with a flange 30 engageable in a complementary groove 31 formed half in the front plate 16 and half in the hub plate 17. That portion of the groove 31 in the hub plate 17 is formed with a bayonet or arcuate slot 32. Each flange 30 has a small projection or pimple 33 which is adapted to engage the bayonet or arcuate slot 32 for releasibly holding each bellows portion 21 in position on the hub plate 17 so that it may be removed when desired.

The operation of the new and improved solid tire cushion wheel is as follows:

The rim section works identically as explained in my prior invention. However, when a leak develops in the cushioning unit 20 it is a simple matter to replace this unit. The wheel must be jacked up so as to take the weight of the vehicle off of it. Then the nuts 29 are removed to release the front plate 16. The plate 16 is removed. The spokes or pistons 14 will be slidably retained in the top portions of the cylinders 15, that is, in the portions in back of the annular outer front strip 13. The pneumatic cushioning unit 20 maintains its position because the small projections 33 are engaged in the bayonet or arcuate slots 32 of the groove 31. Each bellows portion 21 is then turned slightly more than 90° so that the pimple 33 rides out from the slot 32. This frees the pneumatic unit. The pneumatic unit may be repaired by vulcanization, or a new unit may be used.

The repaired unit, or new unit is first mounted on the hub plate 17. Each bellows portion 21 is first turned approximately 90° counter-clockwise. Then the projection 33 is engaged in the slot 32 and the bellows portion is turned approximately 90° back to its original position. In this way each bellows portion 21 is mounted on the hub plate 17. The front plate 16 is then remounted in position.

It should be noted that the front plate 16 and the hub plate 17 are formed with suitable recesses or grooves for accommodating and holding the tubular stems 23 and the annular tube 24. These grooves, or recesses are formed half in the front plate 16 and half in the hub plate 17.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub sections, pneumatic cushioning means for said cylinders and pistons, comprising a removable resilient unit with bellows portions within said cylinders, tube portions connecting said bellows portions, and an air valve for supplying said unit with air.

2. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, said tube portions comprising stem portions connected with the bellows and connecting with an annular tubular portion.

3. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, and means for releasably mounting said unit upon said hub plate.

4. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, and means for releasably mounting said unit upon said hub plate, comprising flange portions on said bellows engaging grooves formed in said hub plate.

5. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, and means for releasably mounting said unit upon said hub plate, comprising flange portions on said bellows engaging grooves formed in said hub plate, said flange portions having small projections engaging arcuate slots in said grooves.

6. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, and said hub section also having an annular outer front strip fixedly mounted on said fixed back plate, and said cylinders having outer portions formed half in said front strip and half in said back strip.

7. In a solid tire cushion wheel having a plurality of segmental rim sections for supporting a tire, and having a hub section with a back hub plate and a removable front plate and a plurality of cylinders formed half in said hub plate and half in said front plate and pistons connected with said rim sections and engaging into said cylinders for movably connecting said rim sections and hub section, pneumatic cushioning means for said cylinders and pistons, comprising a removable resilient unit with bellows portions within said cylinders, tube portions connecting said bellows portions, and an air valve for supplying said unit with air, and said hub section having an annular portion radially outside of said removable front plate and said annular portion being formed with outer portions of said cylinders.

PETER MURPHY.